Figure 1:
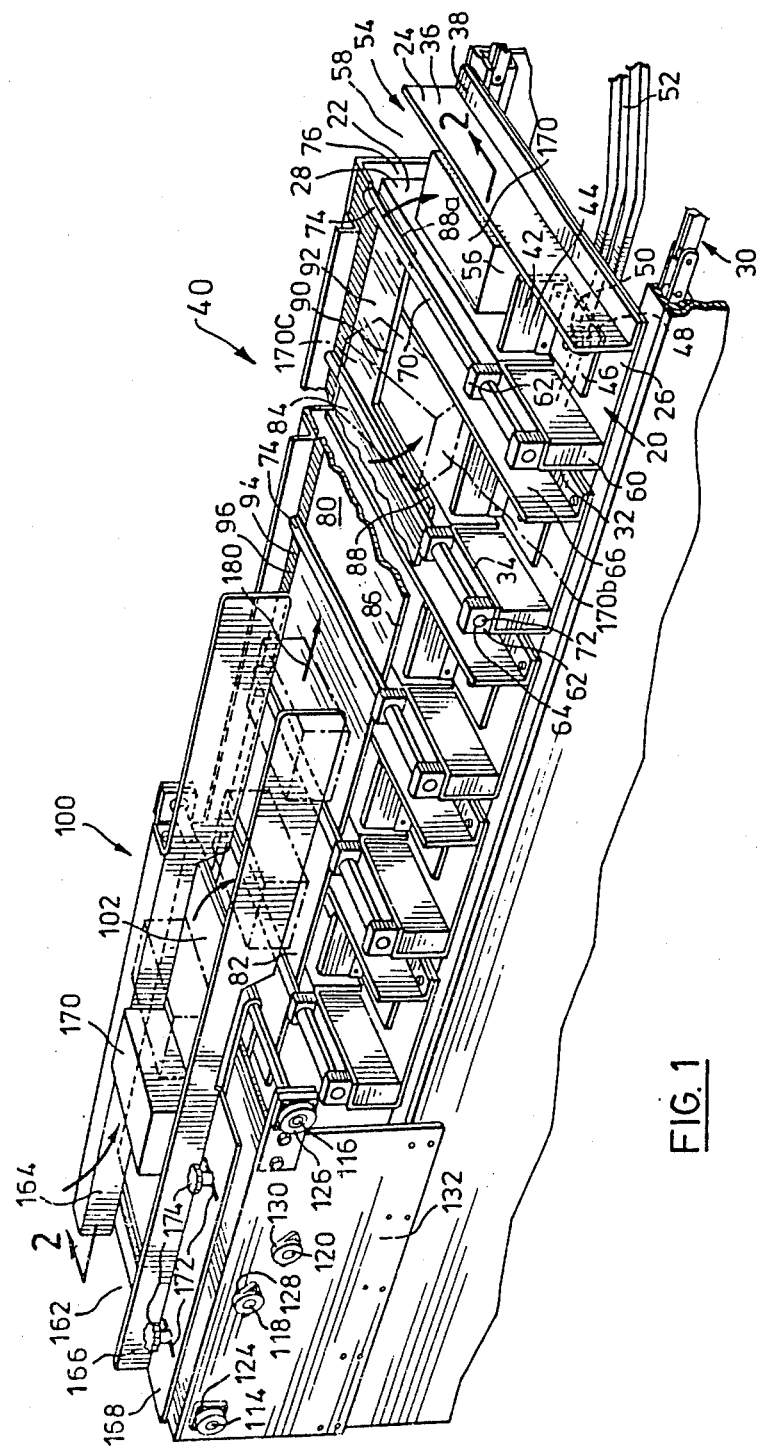

United States Patent [19]

Langen et al.

[11] Patent Number: 4,722,431
[45] Date of Patent: Feb. 2, 1988

[54] LOAD ALIGNING MECHANISM

[75] Inventors: Marinus J. M. Langen, Toronto; Peter Guttinger, Rexdale, both of Canada

[73] Assignee: H. J. Langen & Sons Limited, Mississauga, Canada

[21] Appl. No.: 874,022

[22] Filed: Jun. 13, 1986

[51] Int. Cl.$^4$ .................................. B65G 47/26
[52] U.S. Cl. .................................. 198/459; 198/779
[58] Field of Search .................. 198/461, 575, 476.1, 198/459, 779

[56] References Cited

U.S. PATENT DOCUMENTS

| | | | |
|---|---|---|---|
| 3,589,497 | 6/1971 | Leach | 198/459 |
| 3,879,920 | 4/1975 | Langen | 53/506 |
| 4,101,020 | 7/1978 | Langen | 198/469.1 |
| 4,122,939 | 10/1978 | Langen | 198/476.1 |
| 4,176,741 | 12/1979 | Vogel | 198/779 X |
| 4,267,917 | 5/1981 | Vogel | 198/459 X |

*Primary Examiner*—Andrew V. Kundrat
*Attorney, Agent, or Firm*—Fetherstonhaugh & Co.

[57] ABSTRACT

A loader mechanism for loading articles into receptacles which are mounted at spaced intervals on a conveyor which is continuously driven through a loading station comprises a platform located above the conveyor and load aligning rollers on each receptacle. The platform has a support surface extending parallel to the loading path. A feeder is provided in the loading station which is operable to feed articles one at a time onto the input end of the support surface of the platform from above said platform. The load aligning roller is arranged to extend above the support surface as its associated receptacle passes below said platform while moving through the loading station. The load aligning roller is rotatably driven so as to effectively roll along said platform to cause any article which is fed onto the platform into a position partially supported by the top of the roller and partially supported by the platform to be advanced by engagement with the roller or retarded by engagement with the platform to assume a position between successive rollers to be thereafter pushed by one of the rollers along the platform in alignment with its associated receptacle to fall over the discharge end of the platform into its associated receptacle.

5 Claims, 6 Drawing Figures

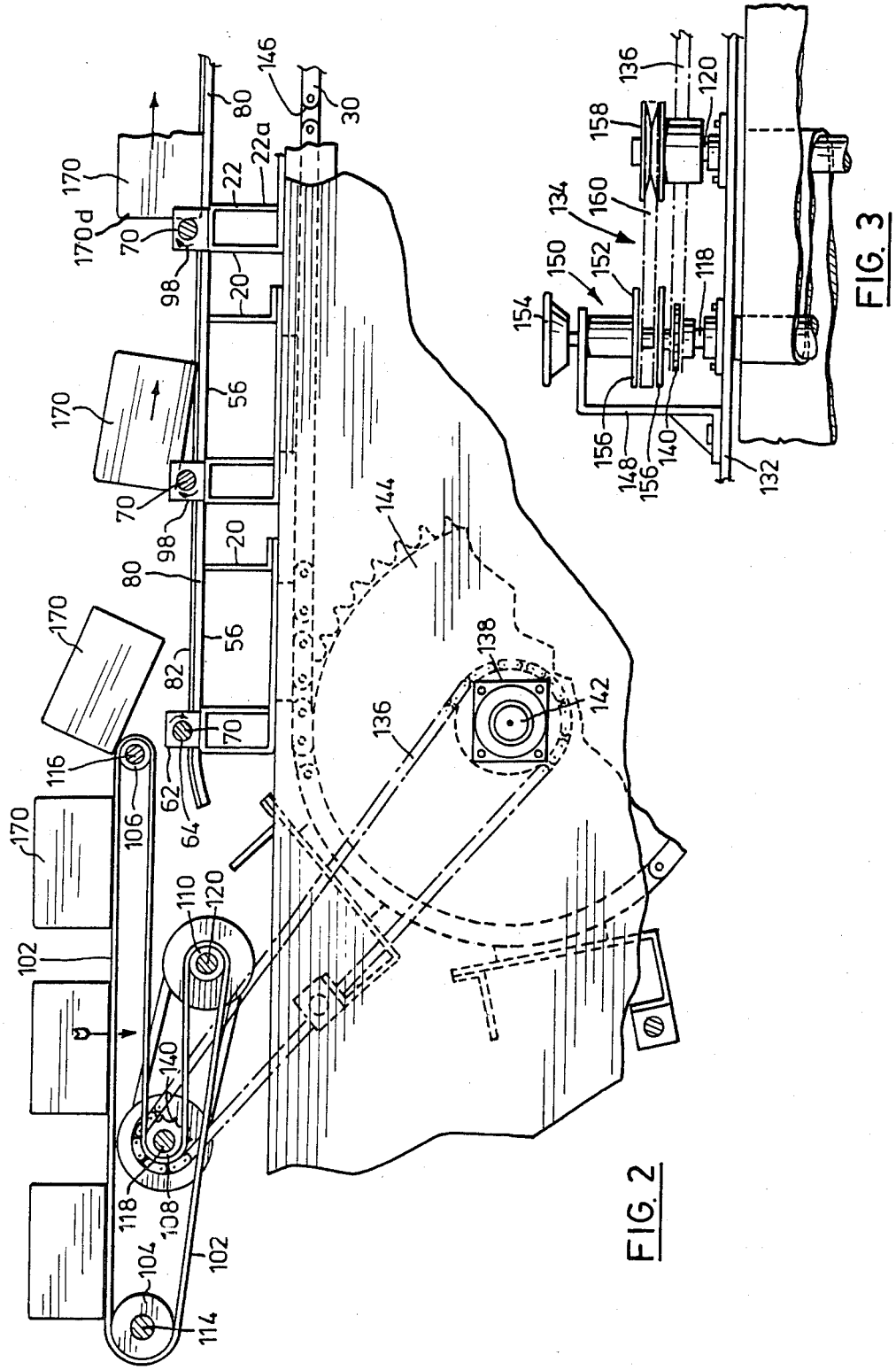

LOAD ALIGNING MECHANISM

FIELD OF INVENTION

This invention relates to loading mechanisms. In particular, this invention relates to a loading mechanism suitable for use in the loading of articles one at a time into the receptacles of a machine for loading end loading cartons. Carton loading machines which employ receptacles into which articles are initially loaded before being transferred into the open end of a carton are well known and are described in prior U.S. Pat. Nos. 3,879,920 and 4,101,020 assigned to H. J. Langen & Sons Limited.

Difficulty has been experienced in providing a simple inexpensive and reliable loading mechanism for loading articles into the receptacles. One of the principal advantages of the carton loading machines of the type described in the above patents, is that they are capable of operating at high speeds and are continuously in motion. It is difficult to syncronize the forward movement of the article with the forward movement of the receptacle without providing an elaborate and expensive mechanism.

It is an object of the present invention to provide a simple and inexpensive loader mechanism for loading articles into receptacles which move continuously through a receptacle loading station.

It is a further object of the present invention to provide an active roller associated with each receptacle which is operable to align the products which are to be loaded into the receptacle with the receptacle prior to loading into the receptacle.

According to one aspect of the present invention there is provided a loader mechanism for loading articles into receptacles which are mounted at spaced intervals on a conveyor which is continuously driven through a loading station along a loading path comprising a platform mounted in said loading station above said loading path, said platform having a support surface extending parallel to said loading path, said platform having an input end and a discharge end, feeder means in said loading station, said feeder means being operable to feed articles one at a time onto said support surface at said input end of said platform from above said platform, a load aligning roller associated with each receptacle for movement therewith, each roller being arranged to extend above said support surface as its associated receptacle passes below said platform while moving through said loading station, said load aligning roller being rotatably driven so as to effectively roll along said platform to cause any article which is fed onto the platform into a position partially supported by the top of the roller and partially supported by the platform to be advanced by engagement with the roller or retarded by engagement with the platform to assume a position between successive rollers to be thereafter pushed by one of said rollers along said platform in alignment with its associated receptacle to fall over said discharge end of said platform into said associated receptacle.

Figure 4:
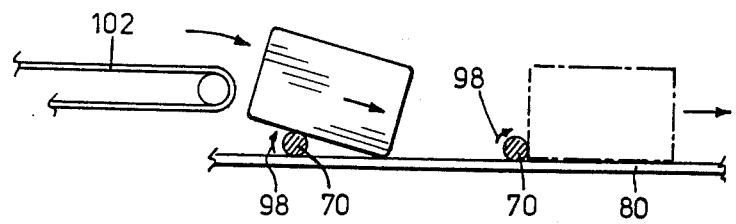
Figure 5:
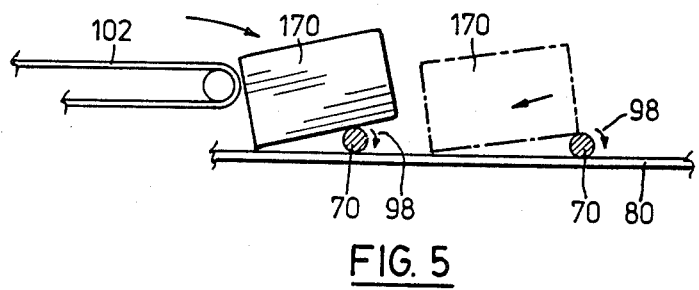
Figure 6:
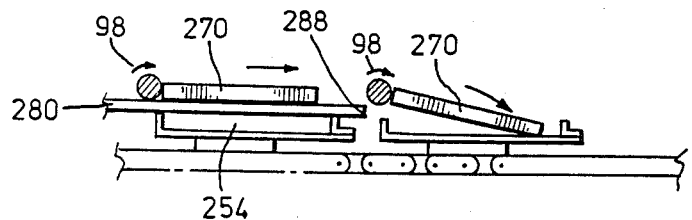

The invention will be more clearly understood after reference to the following detailed specification read in conjunction with the drawings wherein;

FIG. 1 is a partially sectioned pictorial top view of a loader mechanism constructed in accordance with an embodiment of the present invention, FIG. 2 is a partially sectioned side view of the mechanism of FIG. 1 taken along the line 2—2 of FIG. 1, FIG. 3 is a plan view of the power transmission mechanism of FIG. 2 taken in the direction of the arrow A, FIG. 4 is a diagrammatic side view of a platform showing the manner in which a load may be advanced by contact with a loading aligning roller, FIG. 5 is diagrammatic side view similar to FIG. 4 showing conditions which may result in the retarding of the load for alignment purposes, and FIG. 6 is a partially sectioned side view showing shallow receptacles being loaded.

With reference to FIG. 1 of the drawings, the reference numeral 10 refers generally to a loader mechanism according to an embodiment of the present invention. The loader mechanism 10 is suitable for use in association with a carton loading machine of the type described in detail in U.S. Pat. Nos. 3,879,920 and 4,101,020 and consequently the carton loading machine as a whole will not be described in detail.

A plurality of receptacles, each of which is generally identified by the reference numeral 20 are mounted on a conveyor which is generally identified by the reference numeral 30. The conveyor 30 serves to drive the receptacles 20 continuously through the various stations of the carton loading machine including the receptacle loading station generally identified by the reference numeral 40.

The conveyor mechanism, carton opening and carton loading mechanism are well known and will not therefore be described in detail. Each receptacle 20 is formed with two wall units 22 and 24. The wall unit 22 has a flat bottom wall panel 26, a first upright panel back wall 28 and a second upright panel 32 which is spaced rearwardly of the back wall 28 and a top panel 34 which extends forwardly from the second upright panel 32 and terminates in line with the first upright panel or back wall 28. The wall unit 24 consists of a front wall forming panel 36 and a flange 38. The flange 38 extends in a face-to-face relationship with the bottom wall 26. A pusher assembly 42 is located between each back wall 28 and front wall 36 and has an upright pushing wall panel 44 and a horizontal wall 46 which is arranged in a face-to-face relationship with the bottom wall 26. A roller 48 is mounted on a shaft 50 which extends downwardly from the horizontal wall 46 through a slot which is formed in the bottom wall 26 and extends along a major portion of the length of the receptacle 20 to permit movement of the pusher 42 along the receptacle 20 in response to lateral displacement of the roller 46 by the guide track 52. An article receiving compartment 54 is formed by the bottom wall 26, front wall 36, back wall 28 and pusher wall 44. The compartment 54 has an open upper end 56 and an open outer end 58.

A rigidifying block 60 is positioned in the channel formed between the bottom wall 26, second upright panel 32 and top panel 34 and serves to support the top panel 34. A pair of bearing blocks 62 are mounted at opposite ends of the top panel 34 and are each formed with through passages 64. A tubular sleeve 66 extends between the blocks 62 and has a bore aligned with the passages 64. An alignment roller 70 has a proximal end 72 mounted for rotation in the through passages 64 of the bearing blocks 62 and extending through the bore of the sleeve 66. The alignment roller 70 also has a distal end 74. The alignment roller 70 is freely rotatable in the through passages 64 which are each fitted with suitable low friction bushes.

A platform 80 is mounted in the loading station 40 by any suitable mounting means such as by attachment to the back wall 76 of the frame of the machine. The platform 80 extends longitudinally of the loading station directly above the open upper end 56 of the receptacles 20 and may also be supported by the upper edges of the front and back walls of the underlying receptacles. The platform 80 has an input end 82 and a discharge end 84. The platform 80 also has a longitudinally extending first side edge 86. At the discharge end 84, the platform has a transversely extending first discharge edge 88 and a longitudinally extending second discharge edge 90. A ledge 92 extends laterally from the second discharge edge 90. A longitudinally elongated length of plastic material is secured to and extends along the edge of the platform which is remote from the edge 86 and serves to form a longitudinally extending support track 94. The distal ends 74 of each of the alignment rollers 70 passing through the loading station 40 bear against the upper surface 96 of the track 94. The upper surface 96 is a roughened surface which serves to establish frictional engagement with the distal end 74 of the rollers 70 such that when the rollers 70 are driven through the loading station, they will be rotatably driven in the direction of the arrows 98 (FIGS. 2 and 4 to 6).

A feeder mechanism is generally identified by the reference numeral 100 and comprises a feeding conveyor belt 102 which is mounted on support rollers 104, 106, 108, which are in turn supported by shafts 114, 116, 118 and 120. The shafts 114, 116, 118 and 120 are mounted in bearings 124, 126, 128 and 130 which are supported by oppositely disposed main frame side plates 132. A variable speed power transmission system 134 is provided for the purposes of varying the speed of movement of the feeding conveyor belt 102 in relation to the speed of movement of the conveyor 30. The power transmission system 134 includes a chain 136 which serves to transmit power from the main drive sprocket 138 to the sprocket 140. The main drive sprocket 138 is mounted on the drive shaft 142 which is connected to the sprocket 144 which engages the chains 146 of the conveyor 30. Power is supplied to the drive shaft 142 from a conventional power source such as an electric motor (not shown) in a conventional manner. The sprocket 140 is drivingly connected to the shaft 118. As shown in FIG. 3 of the drawings, a bracket 148 is mounted on the side plate 132. A manually adjustable V-belt pulley assembly generally identified by the reference numeral 150 is supported by the bracket 148 and shaft 118 and has a hand wheel 154 which is rotatable to effect movement of the side walls 156 of the pulley toward and away from one another. A spring biased adjustable V-pulley assembly 158 is mounted on the shaft 120. A V-belt 160 drivingly connects the pulley assemblies 156 and 158. By rotating the hand wheel 154, it is possible to adjust the effective working diameter of the pulley 152 and this in turn automatically adjusts the effective working diameter of the spring biased pulley 156. By varying the effective diameters of the pulleys 152 and 158 in this manner, the speed of the conveyor belt 102 can be adjusted in relation to the speed of the conveyor 30.

For the purposes of guiding articles 170 along the loading path 180 which extends through the loading station, side walls 164 and 166 are provided. The side wall 166 is formed with a flange 168 in which adjustment slots 172 are formed. The side wall 166 can be released for movement toward and away from the side wall 164 by releasing the clamping nuts 174 which are threadedly mounted on shafts which extend upwardly through the slots 174 in a conventional manner.

In use, when the conveyor 30 is driven, the receptacles will move continuously through the loading station. The conveyor belt 102 will also be driven and articles such as the packages 170 will be driven along the conveyor belt 102 and will drop from the end of the conveyor belt 102 onto the platform 80. If, as shown in FIG. 2 of the drawings, a portion of the article 170 comes to rest on top of an alignment roller 70, the rotation of the alignment roller 70 may serve to advance the article 170 along the platform 80 at a speed which is greater than the forward movement of the roller 70 thereby moving the article 170 to a position in advance of the roller 70. Thereafter, the roller 70 acts as a pusher which serves to push the article 170 along the platform 80. The length of the platform 80 from the input end thereof to the discharge end thereof is sufficient to ensure that the alignment roller 70 will be caused to rotate in the direction of the arrow 98 a sufficient number of times to ensure that an article can be fully advanced even if only the leading end of the article makes the initial contact with the roller 70. That is to say the length of the track 96 which extends from the input end of the platform to the first lateral discharge edge 88 of the platform is several times greater than the length of the article 170 which is to be aligned thereby.

As shown in FIG. 2 of the drawings, it will be seen that the trailing end 170a of the article 170 makes contact with the side of the alignment roller 70 in a plane which is spaced only a short distance rearwardly of the inner face 22a of the back wall 22 of its associated receptacle. It follows that the article 170 will be driven along the platform substantially in alignment with its underlying receptacle 20 when it is in engagement with the upstream side of its associated alignment roller 70. When the article 70 passes over the transverse discharge edge 80, one end 170b will drop into the article receiving compartment, 54 while the other end 170c will be supported by the ledge 92 until it passes beyond the second laterally extending edge 88a at which time the article will drop fully into the storage compartment 54. The article 170 may then be discharged from the receptacle 20 by the operation of the pusher 42 in a conventional manner.

As shown in FIG. 5 of the drawings, there may be occasions when an article 170 is discharged onto the platform 180 so that the forward end of the article bears against the top of the roller 70. In these circumstances, if the weight of the article 170 is substantial, the frictional contact between the article 170 and the surface of the platform may be greater than the frictional contact between the article and the roller 70 with the result that the roller 70 may advance leaving the article in contact with the conveyor in which case, the following roller 70 will act as the pusher which will push the article 170 along the platform 80.

A further modification is illustrated in FIG. 6 of the drawings. In this application, the article 270 is a low profile article which has to be positioned in shallow storage compartments 254. In this application, the platform 280 is provided with only one transversely extending discharge edge 288. In these circumstances, the article 70 is merely pushed over the edge 288 to drop into the compartment 254. These and other modifications of the present invention will be apparent to those skilled in the art.

From the foregoing it will be apparent that the present invention provides a simple, inexpensive and efficient loader mechanism for use in association with carton loading machines and the like.

We claim:

1. A loader mechanism for loading articles into receptables which are mounted at spaced intervals on a conveyor which is continuously driven through a loading station along a loading path comprising:
   (a) a platform mounted in said loading station above said loading path, said platform having a support surface extending parallel to said loading path, said platform having an input end and a discharge end,
   (b) feeder means in said loading station, said feeder means being operable to feed articles one at a time onto said support surface at said input end of said platform from above said platform,
   (c) a load aligning roller associated with each receptacle and carried by said conveyor for movement with its associated receptacle through said locating station, across said support surface as its associated receptacle passes below said platform while moving through said loading station, said load aligning roller being rotatably driven so as to effectively roll along said platform to cause any article which is fed onto the platform into a position partially supported by the roller and partially supported by the platform to be advanced by engagement with the roller or retarded by engagement with the platform to assume a position resting on the platform between successive rollers to be thereafter pushed by one of said rollers along said platform in alignment with its associated receptacle to fall over said discharge end of said platform into said associated receptacle.

2. A loading mechanism as claimed in claim 1, wherein said load aligning rollers are arranged to bear against said platform to frictionally engage the platform to thereby rotate in response to movement along said platform.

3. A loader mechanism as claimed in claim 1, wherein said platform has a first side edge which extends longitudinally thereof to one side of said loading path, each roller having a proximal end mounted on its associated receptacle so as to be located laterally outwardly from said first side edge of said platform while passing through said loading station and having a sufficient length to extend across said loading path to locate its distal end at the other side of said loading path and wherein a support track extends along said platform at said other side of said loading path, the distal end of each roller being arranged to bear against said support track to be rotatably driven by frictional contact therewith as the receptacles are driven through said loading station.

4. A loader mechanism as claimed in claim 1, wherein said receptacles comprise a front wall, a bottom wall and a back wall defining an upwardly open receptacle, the front wall being located in advance of the back wall in the direction of movement of the receptacles along said loading path, said load aligning roller associated with each receptacle extending directly above said back wall to push the load which is positioned in advance thereof along the support surface in alignment with the underlying receptacle.

5. A loader mechanism as claimed in claim 1, wherein said discharge end of said platform has a first discharge end extending laterally inwardly from one side edge of the platform and a second discharge edge extending longitudinally from the first discharge end, the platform includes a ledge extending laterally from the second discharge edge for supporting one end of an article as the article passes over the first discharge edge so that the article is lowered one end at a time into the receptacle.

* * * * *